Figure 1:
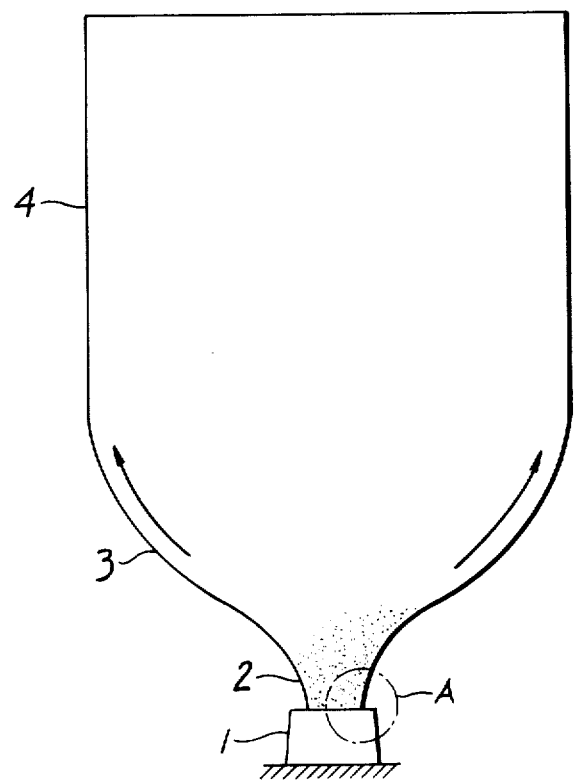

United States Patent [19]

Jofs

[11] 4,045,270
[45] Aug. 30, 1977

[54] METHOD OF AND APPARATUS FOR MAKING A NON-SLIP PLASTICS FILM

[75] Inventor: Jar-Erik Jofs, Vasa, Finland

[73] Assignee: Oy Wilk & Hoglund Ab, Finland

[21] Appl. No.: 678,543

[22] Filed: Apr. 20, 1976

[30] Foreign Application Priority Data

Apr. 28, 1975 Finland .................................. 751269

[51] Int. Cl.² ............................................. B32B 5/18
[52] U.S. Cl. ..................................... 156/229; 156/79; 156/244; 260/2.5 R; 264/45.9; 264/51; 264/95; 264/173; 264/DIG. 14; 428/315; 428/409; 428/910
[58] Field of Search ................ 264/DIG. 14, 51, 45.4, 264/45.9, 46.1, 95, 173; 156/228, 242, 79, 244, 229; 428/315, 409, 910; 260/2.5 R

[56] References Cited

U.S. PATENT DOCUMENTS

| | | | |
|---|---|---|---|
| 3,023,461 | 3/1962 | Sherman | 264/173 |
| 3,682,730 | 8/1972 | Haase | 156/79 |
| 3,956,438 | 5/1976 | Schippers | 264/46.1 |
| 3,957,566 | 5/1976 | Rahlfs | 264/95 |
| 3,966,861 | 6/1976 | Papesh et al. | 264/173 |

*Primary Examiner*—Edward G. Whitby
*Attorney, Agent, or Firm*—McGlew and Tuttle

[57] ABSTRACT

A method of making a non-slip plastic film comprises extruding separate plasticized plastic materials in two streams so that one stream abuts against and adheres to the other to form a combined plastic layer. The combined plastic layer is then stretched by directing air centrally into a tubular formation of this layer. One of the plastic materials comprises a material having an expanding agent or a foaming agent and the stretching causes the breaking of the voids of the foam plastic to form a rough, irregular net-like formation on the exterior of the other plastic. The apparatus includes two separate nozzles arranged to extrude plastic material so as to intersect and form a combined plastic.

8 Claims, 2 Drawing Figures

METHOD OF AND APPARATUS FOR MAKING A NON-SLIP PLASTICS FILM

BACKGROUND OF THE INVENTION

1. Field of the Invention

This invention relates, in general, to a method and apparatus for extruding plastic materials and, in particular, to a new and useful method and apparatus for making a non-slip plastic film.

2. DESCRIPTION OF THE PRIOR ART

Plastics films, especially waterproof plastics films, such as polythen, which at present are used for making different kinds of wrappings, e.g. sacks for fertilizers and the like, for wrapping timber and as protecting covers for example on construction sites, have the great disadvantage of being smooth and glossy and having a very low friction coefficient. As a result of this e.g. sacks made of such plstics film and piled on top of each other tend to collapse very easily and accidents occur. Also the handling itself is time-consuming. The same applies when this plastics film is used for wrapping timber or as covering material on construction sites, especially in the winter when snow and ice increase the risk of slipping. Piling and handling of the slippery wrapping is further aggravated by snow and ice.

Attempts have been made at reducing the risk of slipping by making the surface rough, e.g. by embossing, but such embossing does not have the desired effect as the embossment under pressure rapidly becomes smooth. It is of course possible to give the surface the desired roughness by laminating the plastics film with some other material but this involves special manufacture which is relatively expensive and accordingly not applicable for cheap dispensable wrapping material.

The most common plastics material for sacks and timber wrapping is the polyethylene based plastics material commercially known as polythen, from which films, sacks and the like are ordinarily prepared by extruding, whereby different methods are applied. According to one method the molten plastics material is fed through a nozzle provided with an annular slit, the axis of which is vertically aligned. Above the nozzle the plastic hose or tube is exposed from the inside to air pressure of some degree, whereby the tube is substantially expanded. The thus formed seamless plastics web of annular cross section is fed in an upward direction until it is cooled and is subsequently folded in a direction transverse to the web, e.g. against a roll and from thereon, usually in a downward direction to be wound onto a reel. The air space is defined on the one hand by the nozzle and on the other hand by the point of folding. By adjusting the air pressure it is possible to vary the film thickness to a certain degree. The film is in this case stretchable both in the longitudinal and the transverse direction.

A plain film may also be prepared by forcing the material through an elongated nozzle against a cooled glossy roll which performs the shaping of the film itself. Stretching thus occurs only in the feeding direction of the material web.

Also further methods exist and the plastics film manufactured becomes in all these cases slippery and glossy due to the structure of the material, which is a great disadvantage of the otherwise usable packing material.

SUMMARY OF THE INVENTION

The object of the invention is to overcome this disadvantage in a manner which is simple and easily combinable with conventional plastics film manufacture. In addition to a method the invention also concerns an apparatus for performing the method and furthermore a plastics film manufactured by the method; the characterizing features of the invention appearing from the appended claims.

In the appended drawing the method according to the invention is disclosed as a schematical example, wherein the nozzle of the extruder in a conventional plastics film machine is provided with an annular slit.

Figure 2:
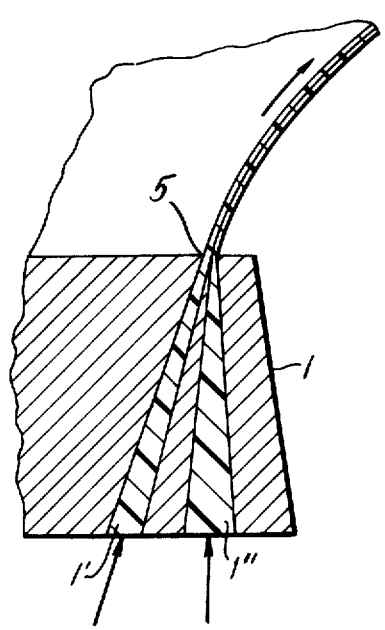

FIG. 1 shows the extruder and the cylindrical plastics web in a side elevation and FIG. 2 shows the detail A of FIG. 1 on an enlarged scale.

Through the nozzle 1 plastics material 2 is fed in a vertical direction through an annular slit in the nozzle so as to form a tubular or cylindrical plastics web. Simultaneously air pressure of some strength is applied within the tube so that the tube side wall is stretched at 3, and at 4 is completely cylindrical. The extruder nozzle 1 is provided with two material feeding slits or ducts 1' and 1''. Through the inner duct 1' ordinary plastics material is fed, advantageously polythen, and through the outer duct 1'' advantageously the same material added with an expanding agent or foaming agent which forms both open and closed voids in the material. It is also of advantage to use temperatures higher than usual at the nozzle to ensure a sufficiently strong foaming action. When the two material webs meet at the outlet point 5 above the nozzle they adhere to each other and are simultaneously exposed to a stretching action brought forth by air pressure or the like. Thereby closed voids break and open voids are stretched, respectively, and on the outer cylinder surface an irregular pattern of rough irregularly netlike protrusions are formed. In this manner the outer surface of the plastics film obtains the desired roughness, which to a high degree facilitates piling and handling of goods wrapped in this kind of film.

By employing three feeding slits in the nozzle it is possible to obtain a rough surface on both sides of the plastics film. This middle layer thus consists of an even film with the foam layers applied to both sides of the even film.

It is self-evident that the method according to the invention may be applied in all such processes in which plastics material is stretched to more or less sheetlike products. A board type product may thus be covered with foam and thereafter stretched or compressed to form the netlike protrusions.

Polythen and similar plastics may also be made to foam by means of different agents, e.g. by blowing into the plastics material a gas, e.g. freon, which is insoluble in the plastics material.

It is also self-evident that the plastics film manufactured according to the invention may be used in combination with other packing materials, e.g. paper and cardboard, whereby the plastics film may be bonded with any known method and a suitable stage during the manufacture of either the film or the further material.

I claim:

1. A method of making a plastic film having a rougher non-slip surface comprising the steps of simultaneously extruding at least two separate plasticized plastic materials so that two streams abut against one another and adhere to one another to form a film having laminated layers defined by the material of said stream and stretching one of said layers relative to the other layer whereby said other layer breaks to define a rougher surface on said stretched layer.

2. The method as defined in claim 1, including the step of applying a foaming agent to one of said plastic materials whereby said foaming plastic material is coated onto the other plastic material, and whereby said other plastic material is stretched causing the voids of said foamed plastic material to break and form rough, irregular net-like formations on said other plastic layer.

3. The method as defined in claim 1, wherein a stretching of said one layer is effected by applying a fluid pressure thereon.

4. The method as defined in claim 3, wherein said laminated layers are extruded in tubular form, and said fluid pressure is applied within the tubular formed layers.

5. The method as defined in claim 4, wherein said applied fluid pressure is air pressure.

6. The method as defined in claim 1, wherein said streams are formed of the same plasticized material, and adding an expanding agent to one of said streams of material.

7. The method as defined in claim 1, and including the step of feeding a gas in one of said plastic materials which is insoluble therein to effect the foaming thereof.

8. A method according to claim 2, wherein a plastic material having a foaming agent is extruded in an outer annular stream in respect ot the other layer which is extruded in an inner annular stream.

* * * * *